J. W. COLLIER.
Coolers for Liquors.

No. 138,478.  Patented May 6, 1873.

Witnesses:  Inventor:

UNITED STATES PATENT OFFICE.

JAMES W. COLLIER, OF NEW YORK, N. Y.

IMPROVEMENT IN COOLERS FOR LIQUORS.

Specification forming part of Letters Patent No. 138,478, dated May 6, 1873; application filed April 14, 1873.

*To all whom it may concern:*

Be it known that I, JAMES W. COLLIER, of the city, county, and State of New York, have invented a new and useful Improvement in Cooling Potable Liquors; and that the following is a full, clear, and exact description of the same, reference being had to the accompanying drawing and to the letters of reference marked thereon, making a part of this specification.

This invention has for its object the cooling of ale and other potable liquors, and the invention consists in cooling the liquors in one or more glass vessels, so that the temperature of the liquors will be reduced without freezing them or reducing their palatableness, in the manner hereinafter shown and described.

It is well known that potable liquors are generally cooled by passing them through a coil of pipe surrounded by ice. This method, however, while answering for some liquors, will not answer for others, such as ale, for the reason that it reduces the temperature so low that the ale will lose its "life," and therefore be less palatable. Besides, the metal in contact with the ale, &c., imparts a metallic taste, which is undesirable, and the consumption of ice in such an apparatus adds materially to the cost of the beverage. It is to avoid these objectionable features that my apparatus has been constructed.

Figure 1:
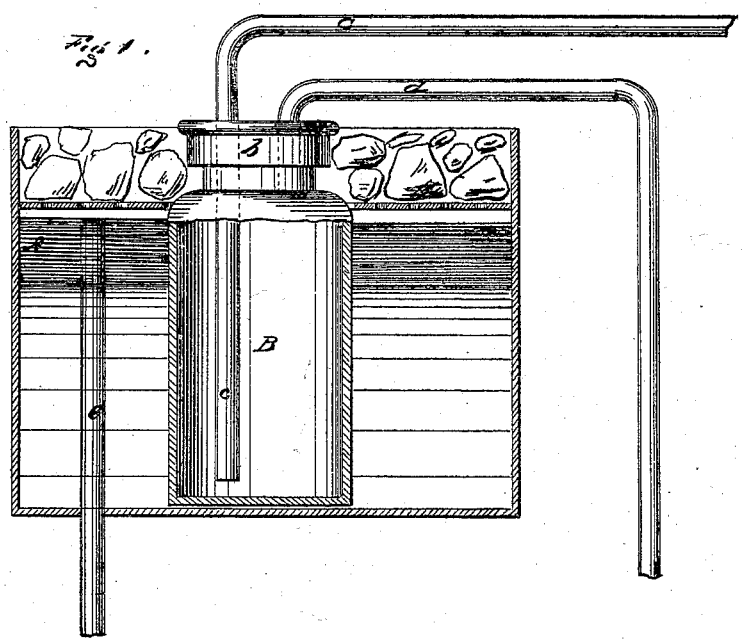
Figure 2:
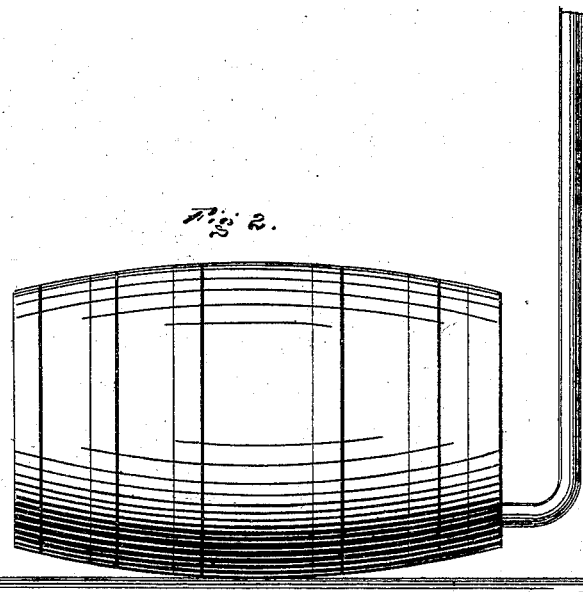

In the accompanying sheet of drawing, Figure 1 is a transverse section of my apparatus.

A represents a tank or wooden case, of any desirable size, and which may or may not be lined with lead or other material, to render the wood impervious to moisture. Within the tank or case is placed one or more glass vessels, B, which are placed upright, resting on the bottom of the tank, the upper ends of the glass vessels being somewhat lower than the upper edge of the tank, as shown in Fig. 1. Passing through a tightly-fitting cap, *b*, of the glass vessel B, are tinned tubes *c* and *d*. One of these tubes, *c*, passes through and nearly to the bottom of the vessel, and the other tube, *d*, passes through the cap *b* into the mouth of the vessel B.

My apparatus being constructed substantially as above described, its operation is as follows: The tank A may be placed either above or below the barrel, or other receptacle containing the liquor, and within said tank is placed the glass vessel B, the tube *d* being suitably connected with the barrel, and the tube *c* continued and leading up and connecting with the pump in a room where the ale, &c., is to be drawn. Ice is then placed around the top of the vessel B, so that as this ice is melted the cold water therefrom will trickle over the vessel B. A vacuum now being formed by means of an ordinary ale-pump in said vessel, the liquor will flow into the vessel B, where it will be cooled by the cold water from the melting ice, as above described, and be drawn out through a tap or nozzle in a cool state. Into the bottom of the tank A is inserted an overflow-pipe, *e*, which projects far enough within the tank A to insure its being sufficiently filled with water to surround the vessel B, and prevent the water from overflowing the tank.

From the foregoing description it will be seen that ale and other liquors cooled by my apparatus are reduced in temperature sufficiently to make the liquor palatable without rendering it so cold as to rob it of its effervescing principle. Besides the liquor does not remain in contact with any metallic substance which would impart a disagreeable flavor to it.

The tank A may contain any given number of glass vessels, and these vessels may be of any required capacity.

For lager-beer, which it has been necessary to use almost as soon as the keg is open, my cooling apparatus is particularly valuable, for, by its use, the beer is not brought in contact with the external air, and it cannot be cooled to such an extent as to destroy its effervescing and palatable qualities. Therefore the beer from one keg or barrel may be kept on draft unimpaired until its contents are exhausted.

Having thus described my invention, what I claim as new, and desire to secure by Letters Patent, is—

1. An apparatus for cooling palatable liquors, consisting of one or more glass vessels, in combination with a tank, in the manner and for the purpose described.

2. Cooling potable liquors by the application of ice and water, in the manner hereinbefore described.

J. W. COLLIER.

Witnesses:
J. B. AITKEN,
JNO. R. REID.